(12) United States Patent
Weiss

(10) Patent No.: US 11,234,442 B2
(45) Date of Patent: Feb. 1, 2022

(54) DEVICE FOR STORING, BAKING, AND DISCHARGING BAKERY GOODS

(71) Applicant: R. Weiss Verpackungstechnik GMBH & Co. KG, Crailsheim (DE)

(72) Inventor: Reinald Weiss, Schopfloch (DE)

(73) Assignee: R. Weiss Verpackungstechnik GmbH & Co. KG

( * ) Notice: Subject to any disclaimer, the term of this patent is extended or adjusted under 35 U.S.C. 154(b) by 196 days.

(21) Appl. No.: 16/467,477

(22) PCT Filed: Dec. 7, 2017

(86) PCT No.: PCT/EP2017/081829
§ 371 (c)(1),
(2) Date: Jun. 6, 2019

(87) PCT Pub. No.: WO2018/104452
PCT Pub. Date: Jun. 14, 2018

(65) Prior Publication Data
US 2019/0297899 A1    Oct. 3, 2019

(30) Foreign Application Priority Data

Dec. 7, 2016 (DE) .......................... 102016123683.7

(51) Int. Cl.
*A47J 36/00*        (2006.01)
*A21B 1/00*         (2006.01)
*A21B 3/00*         (2006.01)
*A21B 7/00*         (2006.01)
*A21B 3/07*         (2006.01)

(52) U.S. Cl.
CPC . *A21B 3/07* (2013.01); *A21B 7/00* (2013.01)

(58) Field of Classification Search
CPC ......... A21B 1/00–02; A21B 7/00; A21B 3/00; A47J 36/00–027
See application file for complete search history.

(56) References Cited

U.S. PATENT DOCUMENTS

| | | | |
|---|---|---|---|
| 5,386,762 A * | 2/1995 | Gokey | A47J 27/14 414/225.01 |
| 7,419,063 B1 * | 9/2008 | Hall | A21B 1/44 211/126.1 |
| 8,276,505 B2 | 10/2012 | Buehler | |
| 8,636,458 B2 | 1/2014 | Auer-Jongepier et al. | |

(Continued)

FOREIGN PATENT DOCUMENTS

| | | |
|---|---|---|
| CN | 204731879 U | 10/2015 |
| CN | 205321017 U | 6/2016 |

(Continued)

*Primary Examiner* — Michael A LaFlame, Jr.
(74) *Attorney, Agent, or Firm* — Steve LeBlanc, LLC

(57) ABSTRACT

A device for storing, baking, and discharging bakery goods includes a plurality of stations with each station having a housing. The plurality of stations include a storage station for receiving a carrier loaded with bakery goods, a baking station for baking the bakery goods located on the carrier, and a discharging station on which bakery goods can be presented and removed. A robot transports the carrier between the plurality of stations. A carrying device provides suspended mounting of the robot, and the carrying device is supported by at least two of the plurality of stations.

13 Claims, 3 Drawing Sheets

(56) References Cited

U.S. PATENT DOCUMENTS

| | | | |
|---|---|---|---|
| 8,827,068 | B2 | 9/2014 | Weiss |
| 9,528,766 | B2 | 12/2016 | Matusewicz et al. |
| 2012/0024170 | A1* | 2/2012 | Fritz-Jung ................ A21C 9/04 99/450.1 |
| 2017/0290345 | A1* | 10/2017 | Garden .................. B25J 9/0093 |

FOREIGN PATENT DOCUMENTS

| | | |
|---|---|---|
| DE | 10 2004 052982 A1 | 5/2006 |
| DE | 20 2007 004902 U1 | 12/2007 |
| DE | 20 2013 100425 U1 | 2/2013 |
| EP | 0 455 477 A2 | 11/1991 |
| EP | 0 478 085 A1 | 4/1992 |
| EP | 2 399 460 A1 | 12/2011 |
| FR | 2 597 239 A1 | 10/1987 |
| WO | WO 2007/051645 A2 | 5/2007 |
| WO | WO 2013/033586 A1 | 3/2013 |

* cited by examiner

DEVICE FOR STORING, BAKING, AND DISCHARGING BAKERY GOODS

PRIORITY CLAIMS

This application claims priority to PCT application PCT/EP2017/081829 filed Dec. 7, 2017, which claims priority to German Patent Application Number 10 2016 123 683.7 filed Dec. 7, 2016.

FIELD OF THE INVENTION

The present invention relates to a device for storing, baking, and discharging bakery goods according to the preamble of claim 1.

BACKGROUND OF THE INVENTION

Such devices are of particular interest for the baking or crisping up of bakery goods in shops, such as supermarkets, in which a high degree of automation is desired.

EP 2 399 460 A1 discloses a baking device which comprises a storage shelf, a loading device, an oven, and a discharging shelf. By means of the loading device, all sections of the baking device are fed centrally. For this purpose, the loading device comprises a rail running in the horizontal direction on the floor, on which a column oriented in the vertical direction is movably mounted. In addition, a loader mounted in a vertically movable manner with a gripping device for a food carrier is provided on the column. The entire construction disclosed in EP 2 300 460 A1 requires a large footprint, is difficult to access for cleaning and maintenance work, and can only be upgraded to a limited extent by further stations.

BRIEF DESCRIPTION OF THE INVENTION

It is an object of the present invention to develop a device of the type mentioned in such a way that in a small space and with relatively little effort, flexible transportation of the carrier is made possible.

This object is solved by the features of the independent claim.

The inventive device for storing, baking, and discharging baked goods has several stations, each with at least one housing. Among these stations is at least one storage station for receiving carriers loaded with bakery goods, a baking station for baking bakery goods located on the carriers, and a discharging station for the presentation and removal of bakery goods. By means of at least one robot, carriers are transported between the stations. According to the invention, the device according to the invention comprises a carrying device for hanging attachment of the robot, wherein the carrying device is arranged being supported by adjacent and/or opposite stations.

The hanging attachment of the robot to stations provided anyway makes a different attachment of the robot, especially on the floor or on a ceiling, superfluous. It eliminates, for example, a reinforcing foundation on the ground or a ceiling reinforcement, which would have to carry the load of the robot. It is thus possible, for example subsequently, to easily add further device elements to the device, since the floor area is freely available. Due to the free floor area, easy cleaning of the floor area is also possible.

Said carriers are particularly preferably sheets, for example with the standard dimensions 40 cm×60 cm. The handling and use of sheets in bakeries is widespread and has proven itself for the simultaneous baking of a plurality of bakery goods. Sheets are sturdy, can hold a relatively large number of bakery goods, and are ideal for gripping and conveying with machines.

Said oven station may be a continuous oven or a stand-up oven. It is also easily possible to use several ovens in the device according to the invention, these ovens are then preferably placed side by side or one above the other. Preferably, a continuous baking oven is used, which also advantageously has a plurality of baking chambers arranged one above the other.

Particularly preferably, the carrying device rests on the housings of adjacent and/or opposite stations. In this case, an optimal weight distribution can be realized on at least two adjacent or opposing stations.

It is advantageous if said carrying device has a central section and two support sections extending therefrom in opposite directions, which are supported by, preferably rest on, said stations. The non-resting central section is preferably used here for attachment of the at least one robot.

In an advantageous development of the invention, the support sections engage in correspondingly complementary sections of at least one housing of the respective station. In this way, an adaptation of the carrying device to the respective housing geometry of the supporting stations can be realized. It is also conceivable that the housing geometry is designed such that one or both support sections are received in compartments of the housing. There are thus various ways to prevent slipping, tilting, or moving of the carrying device.

Preferably, a carrying plate is provided in said central section, to which the base of the robot is attached, preferably hanging. The base of the robot is thus preferably attached to the lower side of the carrying plate directed to the floor. The robot is preferably fixedly attached to the carrying plate and takes over the handling of the carrier by a rotating movement with several degrees of freedom. For this purpose, the robot is preferably equipped with corresponding drives, sensors for detecting the carriers, grippers, etc. The carriers are therefore—preferably individually—moved by the robot from one to the next station. The robot is preferably responsible for the entire transport of the carriers between the stations. Due to the stationary positioning of the robot, a high accuracy of the individual transport processes can be ensured.

In order to realize a hanging attachment of the robot, it is advantageous if the carrying device according to the invention comprises two bars, preferably substantially running parallel to one another. The bars, which are preferably but not necessarily made of steel, are located on two adjacent or opposite stations. A carrying plate located in the middle section between the bars, which is supported on or supported by the bar, serves as a mount for the base of the robot and is preferably arranged centrally to the said stations. The attachment of the carrying plate is not limited to a central position, but may alternatively be in a decentralized position, as long as the robot can reach each of said stations. In addition, it is also conceivable to attach a plurality of robots to the same or additionally provided carrying plates.

An advantageous embodiment provides that the carrying device comprises at least one guide rail, on which the base of the robot is arranged and movable. For example, bars, which may be formed analogously to the aforementioned beams, may be formed as such guide rails. A carrying plate arranged between the guide rails can preferably serve as a mount for the base of the robot. By means of such an embodiment of the carrying device, the robot can be moved along the guide rails—in contrast to a stationary attachment.

This embodiment has the advantage that the device for storing, baking, and discharging bakery goods is not limited by the maximum processing range of the robot, but the robot can be moved individually and can transport carriers.

According to a further advantageous alternative, the carrying device comprises a one-piece elongated carrying plate, which each has a support section on the front side, which each rest on adjacent or opposite stations. In a central section of this carrying plate, the base of the robot is preferably attached, expediently on the underside thereof. The carrying plate is designed such that the length of the plate significantly exceeds its width. By means of the use of a one-piece elongated carrying plate, the attachment of a base, preferably fixed to the underside of the carrying plate, for the robot is not fixed to a predefined, central position, but can be adapted specifically to the respective environmental influences. In addition, it is also conceivable to attach a plurality of robots next to each other on the one-piece elongated carrying plate.

It is advantageous if the said stations are arranged relative to each other so that they form an approximate rectangular shape with an interior space. Such a configuration makes possible a central positioning of the robot, since the stations are located in the transport and processing area of the robot. Due to the interior space formed therein, unrestricted movement of the robot is ensured. The rectangular shape allows an overlying attachment of the carrying device on adjacent stations and opposite stations. However, positioning of said stations is not limited to a rectangular shape.

Particularly preferably, at least two of the storage stations face each other, on or in whose housings the carrying device is supported. The storage stations have, for example, several compartments next to each other and one above the other, in which the carriers loaded with the bakery goods are inserted. A storage station may in this case be provided for bakery goods which have not yet been baked or crisped up, while in the other storage station carriers with already baked or crisped up bakery goods are stored before these carriers are transported by the robot to the at least one discharging station and the bakery goods there, for example, are tipped out into compartments of the discharging station.

It is readily possible that the opposing storage stations each consist of several sub-storage stations, and these sub-storage stations are then preferably placed side by side to support the carrying device. With a correspondingly robust and sturdy construction, said stations are ideal for supporting the carrying device without the need for additional reinforcements. However, a supporting attachment of the support unit is not limited only to the storage stations, but can also be realized in other variations with the baking station, the discharging station, or in combination of at least one of these stations with one or more of the storage stations, insofar as they are designed such that they can support altogether the carrying device together with the at least one robot.

It is advantageous if the at least one storage station, the at least one oven, and the at least one discharging station are arranged around the at least one robot. The robot mounted on the carrying device is thus arranged centrally with respect to the stations, with the robot realizing all transport paths of the carriers.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
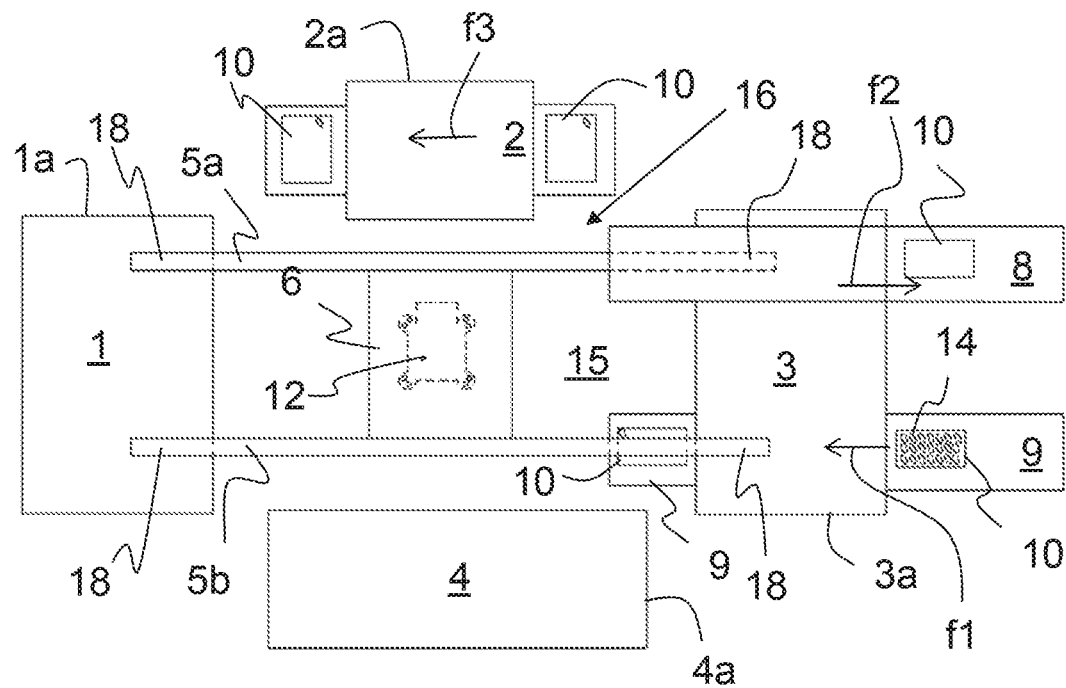
FIG. 1 shows a plan view of a device according to the invention.

FIG. 1 shows a plan view of a device according to one embodiment of the invention, which is preferably installed in a supermarket in a separate area from the customer area, but adjacent to a customer area. Here, two storage stations 1, 3, a continuous baking oven as a baking station 2, and a discharging station 4 are provided. A storage station 1 with a plurality of corresponding storage compartments is provided for carriers 10, which are designed as baking trays, which are equipped with bakery goods to be baked or crisped up. The storage station 1 arranged opposite the storage station 3 is provided for receiving carriers 10, which have passed through the continuous baking oven 2 and which are temporarily stored in the storage station 3 before being transported to the discharging station 4. The stations 1, 2, 3, 4, all of which have a corresponding housing 1a, 2a, 3a and 4a, respectively, are arranged in a rectangle and form an interior space 15 between them.

A robot 7 is provided which inserts carriers 10 with bakery goods 14 in the storage station 1 and can be removed from this. From the storage station 1, the robot 7 transports the carriers 10 as a rule to the baking station 2, where they pass through the continuous baking oven (conveying direction f3). Subsequently, the robot 7 transports the carriers to the storage station 3 or directly to the discharging station 4. The transport and preferably baking operations are preferably taken over by a central controller.

Figure 2:
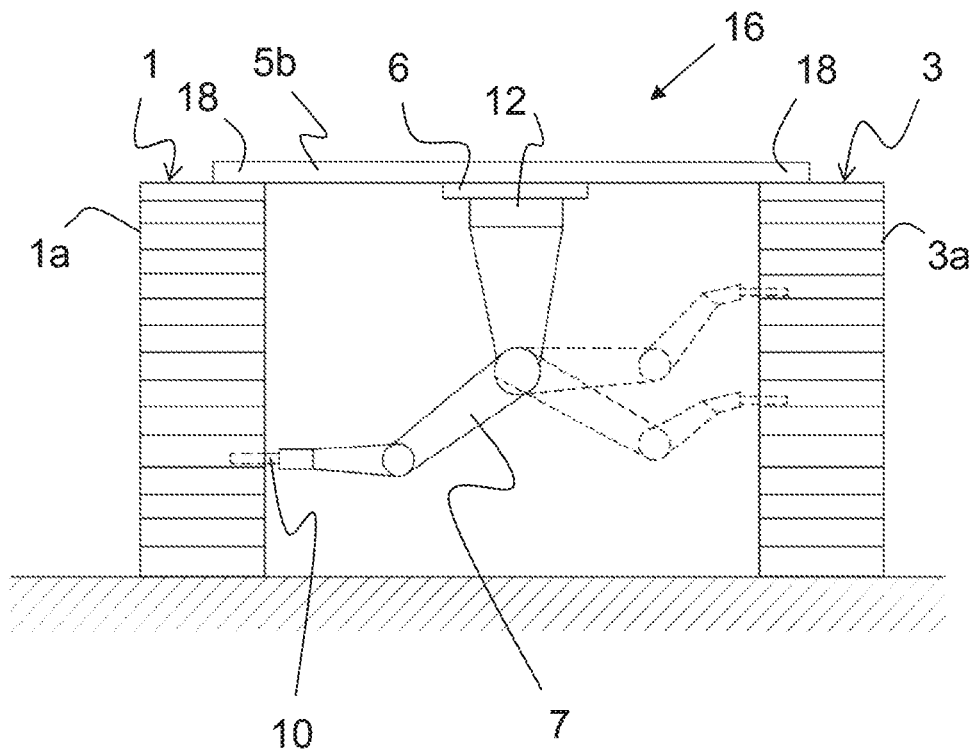
FIG. 2 shows a side view of the device shown in FIG. 1.

According to one embodiment of the invention, a carrying device 16 is provided for hanging attachment of the base 12 of the robot 7, which in the embodiment shown in FIGS. 1 and 2 consists of two, preferably substantially parallel bars 5a, 5b and a carrying plate 6 extending between the bars 5a, 5b. The carrying plate 6 is arranged in a middle section 17 of the two bars 5a, 5b, wherein two support sections 18 extending in opposite directions are provided from the central section 17. The support sections 18 are stationary on the housings 1a, 3a of the storage stations 1, 3, wherein the support sections 18 may be attached to the housings 1a, 3a with fasteners, such as screws, welds, etc. At the carrying plate 6 located in the middle section 17, the base 12 of the robot 7 is preferably suspended on the side facing the ground and centrally fixed with respect to the stations 1, 2, 3, 4, for example by screwing. Due to the central arrangement of the robot 7, this can reach each station 1, 2, 3, 4.

A transport device designed as a conveyor belt 9 leads to the said interior space 15 of the device according to the invention. The free end of said conveyer belt 9 (conveying direction f1) 15 projecting into the interior space provides the carriers 10 loaded with bakery goods 14 available to the robot 7 for receipt. From there, the robot 7 can transport the carriers 10 to the respective stations 1, 2, 3, 4, preferably initially to the storage station 1 or right to the baking station 2. In the present case, the robot 7 takes over all transport paths of the carriers 10 equipped with or without bakery goods 14. A discharge conveyor 8 for the emptied carriers 10 is shown only schematically above the storage 3 in the illustrated embodiment (conveying direction f2). Preferably, the robot 7 transfers the empty carriers 10 onto the discharge conveyor 8, which leads out of the interior space 15.

FIG. 2 shows a side view of the device shown in FIG. 1. FIG. 2 shows a bar 5b with a carrying plate 6 located in the middle section 17, on the underside of which the base 12 of the robot 7 is fastened. Likewise, the embodiment of the storage stations 1, 3 is shown schematically with a plurality of juxtaposed and stacked compartments. The compartments of the respective storage stations 1, 3 can be of different heights so that carriers 10 loaded with larger bakery goods 14 can also be conveyed into the storage station 1, 3. FIG. 2 shows an exemplary transport of the carriers 10 by means of the robot 7. The carriers 10 are therein conveyed by the robot 7 from one station 1, 2, 3, 4 to the next. The robot 7 is thus responsible for certain ways or parts of the transport or for all transports of the carriers 10.

In the following description of the alternative embodiment illustrated in FIGS. 3 and 4, the same reference numerals are used for features that are identical and/or at least comparable in their design and/or mode of action compared to the first exemplary embodiment shown in FIGS. 1 and 2. Unless these are explained in detail again, their design and/or mode of action corresponds to the design and mode of action of the features already described above.

Figure 3:
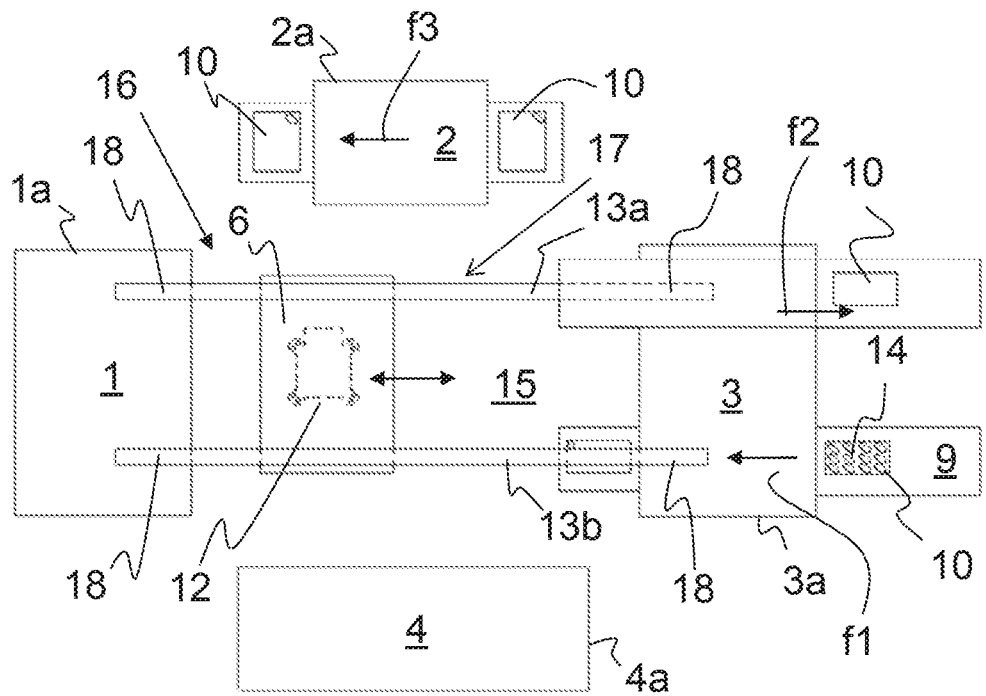
FIG. 3 shows another embodiment of a device according to the invention in plan view.

FIG. 3 shows an embodiment of the inventive device with a carrying device 16 in plan view, which provides two guide rails 13a and 13b. The guide rails 13a, 13b are arranged resting on the housings 1a, 3a of the stations 1, 3 by means of the support sections 18 and are optionally additionally fastened. The base 12 of the robot 7 is fastened to the carrying plate 6 located in the middle section 17, which—together with the robot 7—can be moved linearly back and forth along the guide rails 13a, 13b in the x-direction (see double arrow f4).

Figure 4:
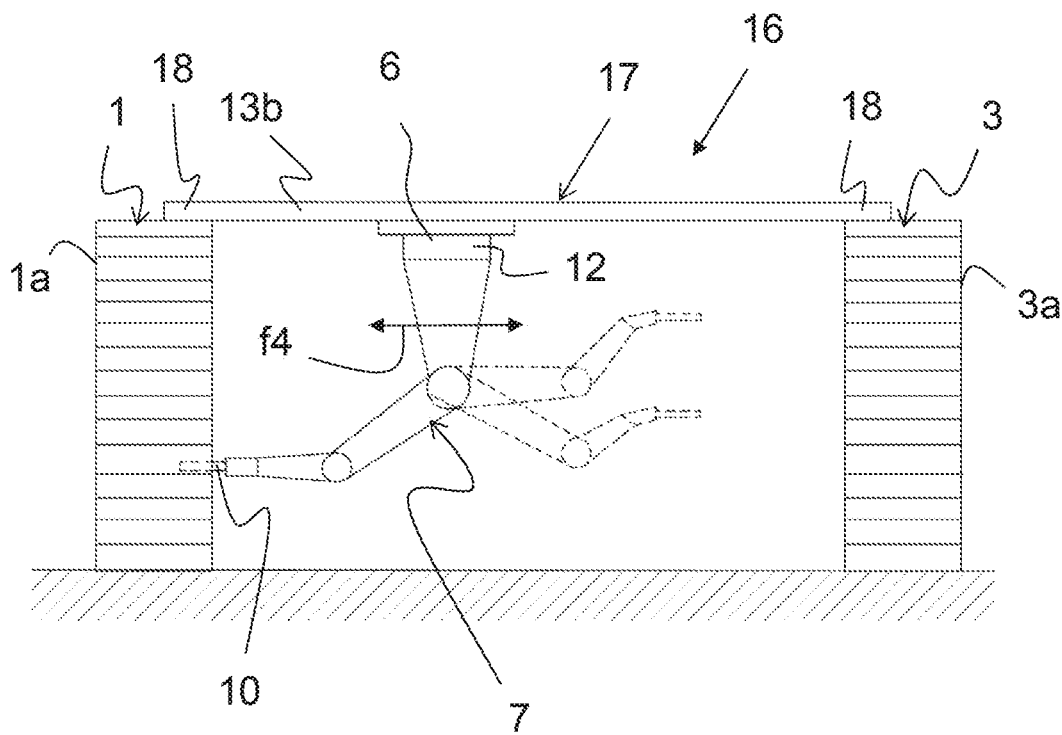
FIG. 4 shows a side view of the device shown in FIG. 3.

FIG. 4 shows a side view of the device shown in FIG. 3. FIG. 4 shows one of the two provided guide rails 13b with a carrying plate 6 located in the central portion 17, to which the base 12 of the robot 7 is attached. The carrying plate 6 together with the robot 7 is moved closer to the storage station 1 in the illustrated situation in order to equip it with a carrier 10 or to remove a carrier 10 and to transport it to the baking station 2.

In the following description of the alternative embodiment shown in FIG. 5, the same reference numerals are used for features that are identical and/or at least comparable in comparison to the first embodiment shown in FIG. 1 in their design and/or mode of action. Unless these are explained in detail again, their design and/or mode of action corresponds to the design and mode of action of the features already described above.

Figure 5:
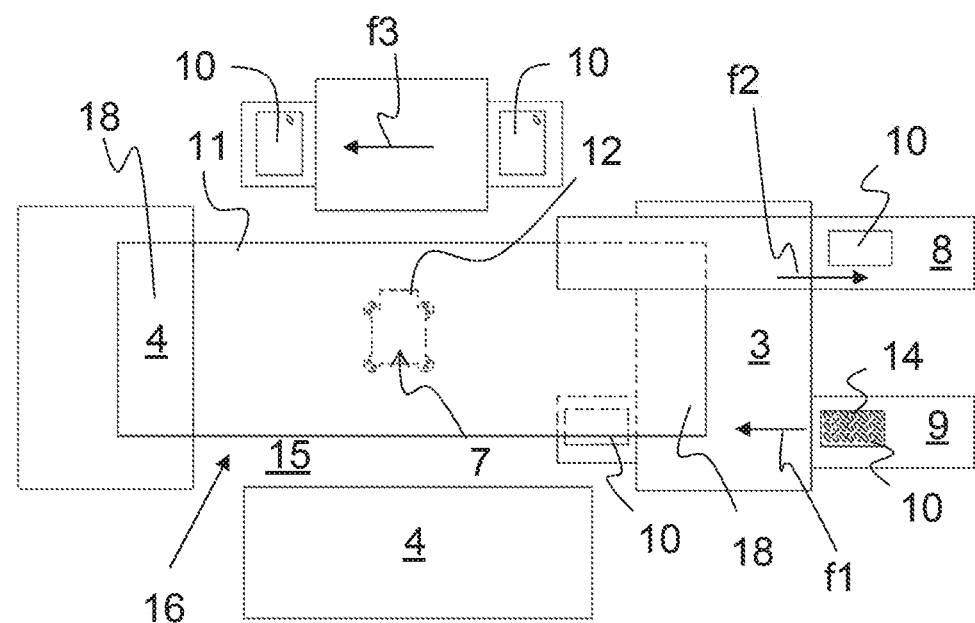
FIG. 5 shows a further embodiment of a device according to the invention in plan view.

FIG. 5 shows a further exemplary embodiment of the device according to the invention in plan view. FIG. 5 shows an embodiment of the carrying device 16 as a one-piece elongated carrying plate 11 of steel, for example, which rests with its support sections 18 on at least two adjacent or opposite stations, in this case again the housings 1a, 3a of the storage stations 1, 3. On the carrying plate 11, the base 12 of the robot 7 is fixed hanging stationary. The one-piece carrying plate 11 distributes the load from the robot 7 to a relatively large area.

The present invention is not limited to the illustrated and described embodiments. Variations within the scope of the claims are also possible as a combination of features, even if they are shown and described in different embodiments.

What is claimed is:

1. A device for storing, baking, and dispensing baked goods, comprising:
   a plurality of stations, each station having at least one housing, wherein the plurality of stations include a storage station for receiving a carrier equipped with baked goods, a baking station for baking the baked goods located on the carrier, and a dispensing station at which baked goods can be presented and removed;
   a robot which transports the carrier between the plurality of stations; and
   a carrying device for suspended mounting of the robot, wherein the carrying device is supported on at least two of the plurality of stations and the carrying device rests on the top side of the housings of oppositely arranged stations of the plurality of stations.

2. The device as in claim 1, wherein the carrying device rests on the housings of adjacent stations of the plurality of stations.

3. The device according to claim 1, wherein the carrying device has a central section and two carrying sections extending from the central section in opposite directions.

4. The device according to claim 3, wherein the two carrying sections engage in a complementary section of at least one housing of the plurality of stations.

5. The device according to claim 3, further comprising a carrying plate in the central section attached to a base of the robot.

6. The device according to claim 1, wherein the carrying device comprises two parallel bars of steel and a carrying plate, wherein the two parallel bars of steel rest on two adjacent stations, and the carrying plate extends between the two parallel bars of steel and suspends a base of the robot.

7. The device according to claim 1, wherein the carrying device comprises two guide rails which rest on two of the plurality of stations, a carrying plate is arranged between the two guide rails, and a base of the robot hangs from the carrying plate.

8. The device according to claim 1, wherein the carrying device comprises a one-piece elongated carrying plate having a central section and two carrying sections, wherein the carrying sections rest on two of the plurality of stations, and wherein a base of the robot is attached to the central section.

9. The device according to claim 1, wherein the plurality of stations are arranged relative to each other in a rectangle with a centrally located interior space.

10. The device according to claim 1, further comprising a plurality of storage stations located opposite one another, and the carrying device is supported by the plurality of storage stations.

11. The device according to claim 10, wherein the robot is attached to the carrying device and located between the plurality of storage stations, the baking station, and the dispensing station.

12. The device according to claim 1, wherein the carrying device comprises two parallel bars of steel and a carrying plate, wherein the two parallel bars of steel rest on two stations arranged opposite to each other, and the carrying plate extends between the two parallel bars of steel and suspends a base of the robot.

13. The device according to claim 7, wherein the robot is fixed to the carrying plate, wherein the carrying plate is movable along the two guide rails.

* * * * *